Oct. 17, 1939.   B. B. KAHN   2,176,075
STOVE
Filed Feb. 9, 1931   3 Sheets-Sheet 1

Inventor
Bertrand B Kahn
By Maréchal & Noz
Attorney

Oct. 17, 1939.  B. B. KAHN  2,176,075
STOVE
Filed Feb. 9, 1931  3 Sheets-Sheet 2

Inventor
Bertrand B Kahn
By Maréchal & Noé
Attorney

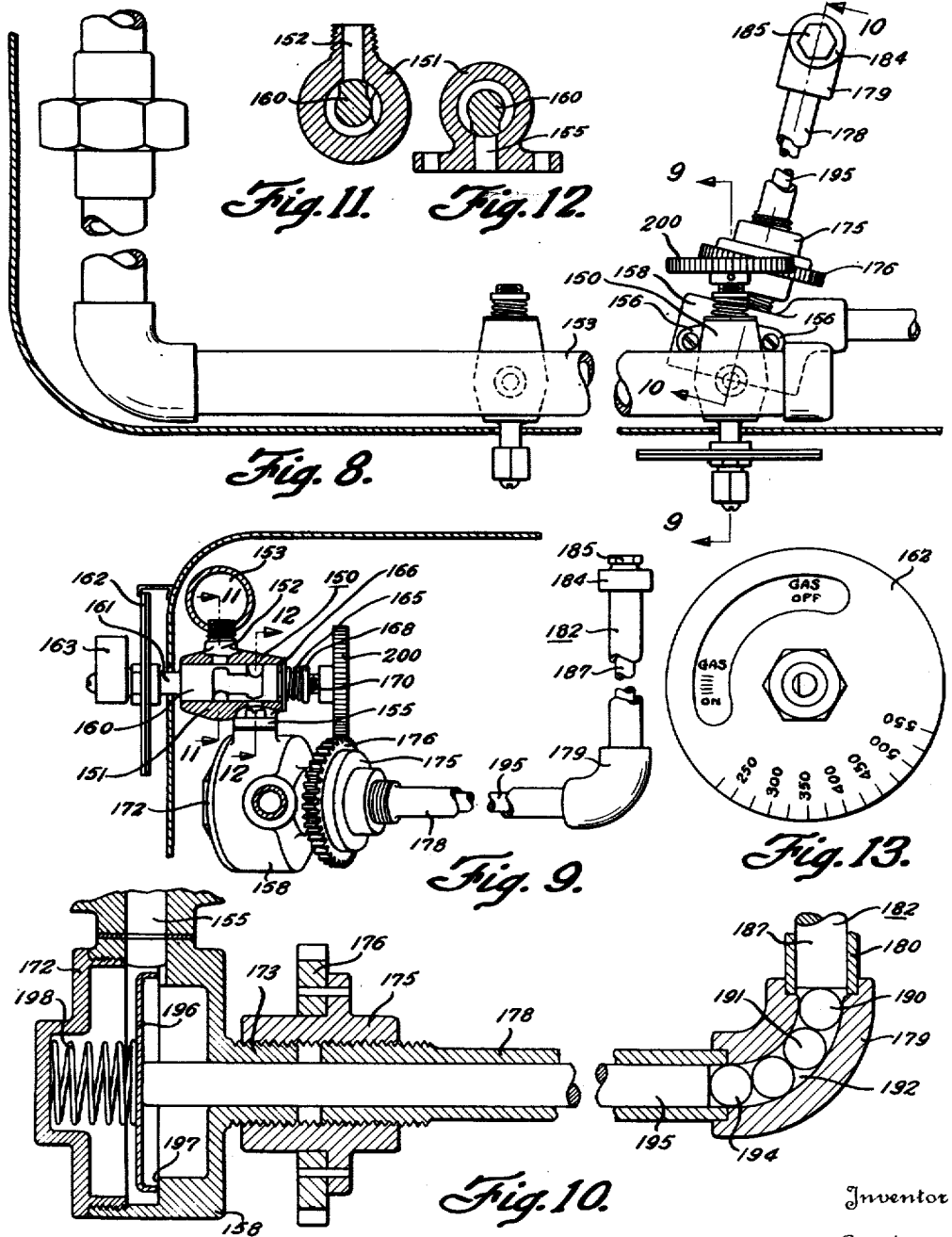

Patented Oct. 17, 1939

2,176,075

UNITED STATES PATENT OFFICE 2,176,075

STOVE

Bertrand B. Kahn, Cincinnati, Ohio, assignor to
The Estate Stove Company, Hamilton, Ohio,
a corporation of Ohio Application February 9, 1931, Serial No. 514,500

12 Claims. (Cl. 236—15)

This invention relates to heating appliances, and more particularly to control devices therefor for regulating the flow of fuel to a burner.

One of the principal objects of the invention is the provision of an improved fuel and temperature control device for gas stoves and the like having manually operated means for effecting intercontrolled operation of the main fuel valve and the temperature controlled valve; which is simple of operation and adjustment, of compact construction, and readily attachable for use.

Another object of the invention is the provision of such a control device having an operating member which is operatively connected to the main valve to effect opening and closing thereof and also connected to adjust the temperature responsive element of the temperature controlled valve.

Other objects and advantages of the invention will be apparent from the following description, the accompanying drawings, and the appended claims.

In the drawings, which illustrate preferred embodiments of the invention—

Fig. 8 is a plan view of a control device showing a somewhat different arrangement of parts;

Fig. 9 is a side elevational view of the structure shown in Fig. 8; some of the parts being shown sectionally as indicated by the line 9—9 of Fig. 8;

Fig. 10 is a sectional view taken on the line 10—10 of Fig. 8;

Fig. 11 is a sectional view through the shut-off valve as indicated by the line 11—11 of Fig. 9;

Fig. 12 is a sectional view of the shut-off valve taken on the line 12—12 of Fig. 9; and Fig. 13 is a plan view of the indicating dial shown in Figs. 8 and 9.

Figure 1:
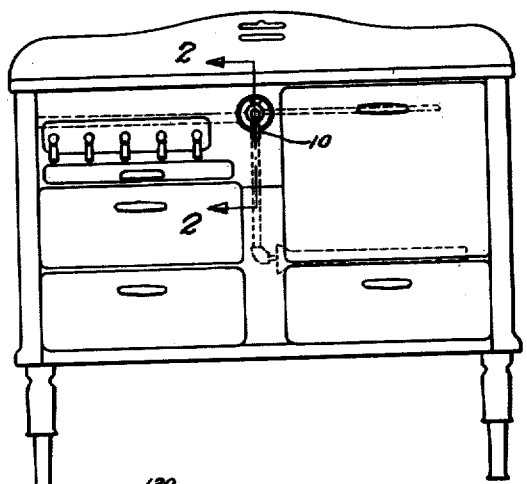
Fig. 1 is an elevational view of a cooking stove having a control device constructed in accordance with the present invention.
Figure 2:
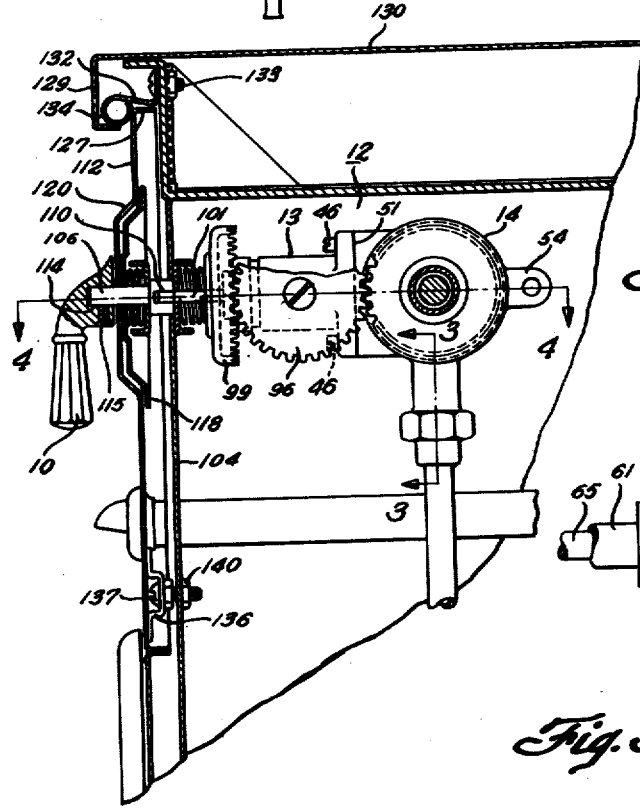
Fig. 2 is a sectional view taken on the line 2—2 of Fig. 1.
Figure 3:
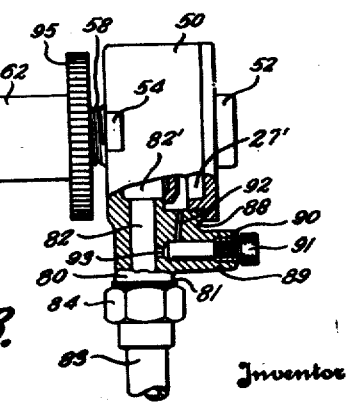
Fig. 3 is a view partly in section as indicated by the line 3—3 of Fig. 2.
Figure 4:
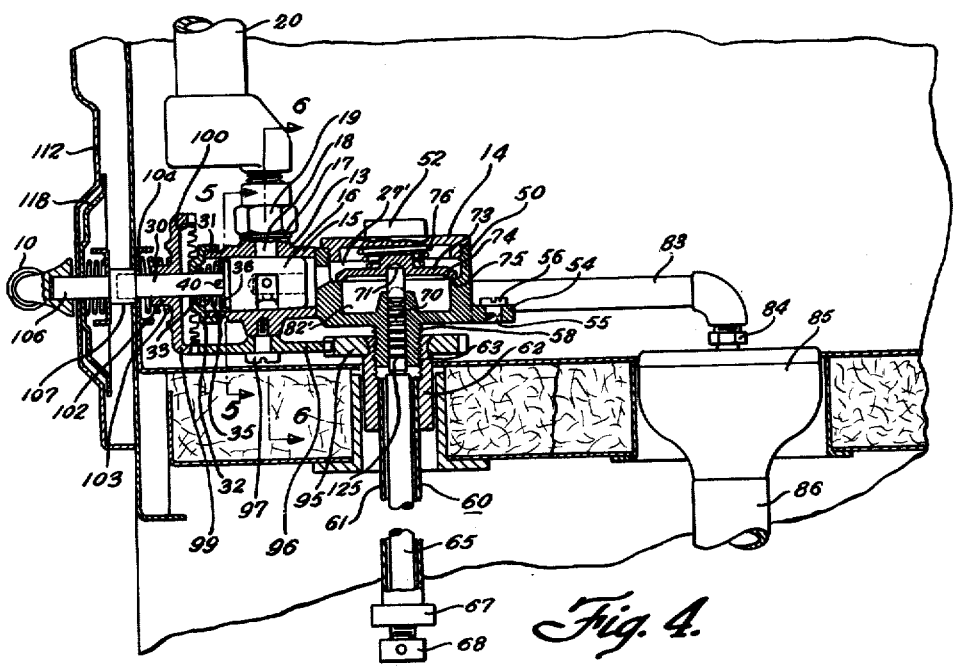
Fig. 4 is a sectional view taken on the line 4—4 of Fig. 2.

The invention is illustrated as embodied in a gas cooking stove; and in the drawings like characters of reference designate like parts throughout the several views thereof. The control mechanism shown therein includes manual means for turning the gas on and off and automatic means for controlling the flow of gas during heating in accordance with the temperature of the space adjacent a temperature responsive element associated with the control device. As shown, the control device is provided with an operating handle 10 which projects through the front of the stove at a position within easy reach of the operator so that adjustment of the device may be readily made. The control device, indicated generally by the numeral 12, comprises a shut-off valve structure 13 and a temperature controlled valve structure 14; the two being removably connected to one another and having an intercommunicating fuel passage from one valve to the other as well as connections for attachment to the fuel source and to the burner.

The shut-off valve 13 comprises a barrel-like housing 15 within which is fitted a tapered rotatable valve plug 16. The housing 15 is provided with a laterally extending boss 17 within which is provided a gas passage 18 opening into the interior of the housing. The boss 17 is threaded to receive a union 19 for connection to a source of gas supply such as the manifold 20. The plug 16, which controls the passage of gas through the valve 13, is provided with an annular cut-away portion 22 positioned to register with the passage 18 of the valve housing when the plug is in assembled position. The cut-away portion 22 does not extend entirely around the valve plug but is so proportioned that a blank face remains which may be turned into registration with the passage opening 18 to provide a closed position for the valve. The extent of the cut-away portion is such that after moving the valve plug an amount sufficient to provide for registration of the cut-away portion with the passage 18, the valve plug may then be moved an additional amount while still maintaining communication with the passage. The plug 16 has an axial passage 24 formed in it with communicating openings 25 extending to the cut-away part 22. The central passage 24 is formed as a drilled hole opening toward the open end of the housing 15 to which the valve 14 is attached, and provides a passage for the flow of gas from the supply manifold 20 through the shut-off valve and into the housing of the temperature controlled valve 14; the valve 14 having a passage 27 which communicates with the open end of the housing 15.

The large diameter end of the tapered valve plug 16 has an axially extending operating stem 30 which projects beyond the valve housing an amount sufficient to be engaged by the operating handle 18. The end of the barrel-like housing from which the stem 30 extends is externally threaded at 31 to receive a cap 32 having an opening 33 through which the stem 30 projects. A coil spring 35 is positioned beneath the cap to exert tension against a washer 36 which rests against the large diameter end of the plug 16 and serves to hold the plug in proper operating position within the housing. The washer 36, which also serves to limit the rotational movement of the plug, is provided with a tongue 38 which engages a slot 39 provided in the end 31 of the valve housing to prevent the washer from turning with respect to the housing. The washer 36 limits the rotational movement of the valve plug by serving as a stop for a pin 40 which projects from the end of the plug and extends parallel to the plug axis. The washer 36 is cut away at 42 to provide clearance for movement of the pin 40; the cut-away portion being shaped so that a projection 43 is provided having limiting faces 44 provided in the path of movement of the pin 40. The angular extent of the projection 43 is such that the valve plug may rotate through the desired angular travel, shown as 270° of movement, and the pin 40 is positioned on the stem so that in one limiting position the valve is "off."

The temperature controlled valve 14 is attached to the housing 15 of the shut-off valve 13 by means of screws 46 which extend through holes 47 in oppositely projecting ears 48 of the valve 13 and are threadedly held in the housing of the valve 14; the joint between the contacting faces of the valves being made gas tight as by provision of a suitable gasket.

The temperature controlled valve comprises a cylindrical housing 50 having a flattened side wall portion 51 which contacts with the housing for the valve 13, and is provided with a removable end plug 52 through which access to the valve interior is had. In addition to being attached to the shut-off valve 13, further support for the valve structure is provided by an extended ear 54 on the housing 50 having an opening 55 for an attaching screw 56 held by the stove structure. The housing 50 is provided with an externally threaded axially extending boss 58 for the attachment of a temperature responsive element which comprises telescoped members having different expansion coefficients; the exterior member 61 being secured to a sleeve 62 having an internally threaded portion 63 which is adapted to threadedly engage the housing extension 58. The exterior member 61 is preferably a copper tube which encloses an interior rod 65 formed of carbon. The end of the member 61 remote from the sleeve 62 is provided with an attached cap 67 within which is threadedly received an adjusting screw 68, the end portion of which bears against the end of the rod 65. As the expansion coefficient of copper is approximately three times that of carbon any temperature change in the air surrounding the element will produce relative movement between the free ends of the tube 61 and the rod 65. As mentioned, the tube end is attached to the sleeve 62 which is in turn threadedly attached to the housing 50. The end of the rod 65 contacts with a pin 70 which extends through an axial passage in the housing 50 and bears against the valve member 73 which is positioned within the housing 50 and is arranged to seat against the valve seat 75. When the valve is thus seated, the housing is divided into two compartments. The compartment numbered 27' is in communication with the gas inlet passage, while the compartment 82' has communication with a gas supply pipe 83 to the burner.

Movement of the pin 70 produced by expansion or contraction in the heat responsive element actuates the valve member 73 to regulate the flow of gas through the housing 50 in accordance with the temperature of the element. As shown, the valve member 73 is of disk-like form having an annular rim or face 74 which is urged towards contacting engagement with the annular shoulder or seat 75 of the housing 50 by means of a spring 76 positioned between the valve 73 and the housing cap 52. The spring urges the valve towards closed position and its movement is resisted by the element 60. A boss extension 80 on the housing 50 which terminates in a threaded end 81 is drilled, as indicated at 82, to provide a passage from the interior of the housing compartment 82' to the burner pipe 83 which is attached to the boss end 81 as by means of the union 84. The passage outlet 82 is on the opposite side of the valve member 73 from the passage 27 so that flow of gas through the passage 82 is regulated by the position of the valve 73. The pipe 83 is shown as terminating in the usual adjustable orifice 84 for the mixing valve 85 of the burner 86.

In order to provide a regulated minimum flow of gas to the passage 83 when the valve member 73 is in closed position, a by-pass 88 is provided in the valve housing 50 to permit gas to flow from the shut-off cock directly to the pipe 83 without passing through the opening controlled by the valve member 73. As shown, the housing 50 is provided with an extending boss 89 which is drilled and threaded at 90 to receive an adjusting screw 91 which regulates the flow of gas through a passage 92 extending from the housing compartment 27' to the space adjacent the valve 91; the valve 91 controlling the flow from this point through a passage 93 connecting to the pipe 82.

The operating means for the control device is so arranged that rotational movement of the valve plug 16 provides for rotational movement of the element 60 upon the threaded stem 58 to vary the setting of the valve member 73. Such a connection of parts permits the flow of gas through the shut-off valve to be controlled as well as provides for setting or adjustment of the valve member 73 by the element 60 by a single action on the part of the operator. As shown, the extending portion 63 of the element sleeve 62 has attached to it a gear 95. A second gear 96 is positioned in interfitting engagement with the gear 95 and is shown axially mounted upon a shouldered screw 97 which engages a projection on the valve housing 15. A third gear 99 is mounted on the valve stem 30 in such a manner that it may move axially of the stem and into meshing engagement with the gear 96; the gear 99 being formed from a blank of cup-like shape in which the teeth are provided on the edge of the flange portion 100. The end portion 101 of the stem 30 is flatted as indicated and the hub portion 102 is of similar shape so that when assembled to the stem a driving engagement is provided. The gear 99 is held in intermeshing contact with the gear 96 under tension provided by a spring 103 which bears against the gear 99 and a plate portion 104 of the stove structure. The end of the valve stem 30 extends through an opening in the plate 104 for engagement by the projecting end of the shaft 106 of the operating handle 10.

The handle 10 and shaft 106 are mounted upon a plate portion 112 which is removably attachable to the front of the stove and serves as a closure therefor. As shown, the end of the shaft 106 remote from the handle 10 is provided with an enlarged portion 107 having a cross slot 110 which engages the stem upon assembly of the control handle and its associated parts to the stove. The shaft 106 is flatted at 114 for assembly of the handle 10 in proper relation to the slot 110 so that when attached to the stove the handle will stand vertically when the valve is in closed position. The handle is held in place on the stem by means of a set screw 115.

An indicating disk 118 is mounted on the shaft 106 on the rear side of the panel 112 and is maintained in proper position with respect to the handle and the valve operated thereby by having a shaft opening 119 similar in shape to the shaft 106. The rim portion of the disk 118 is provided with a series of indications which are visible through an opening 120 in the plate 112; these indications are placed on the dial in definite relationship to the valve position and are so arranged as to show through the opening 120 the positions of the valves controlled by the handle 10.

Figure 5:
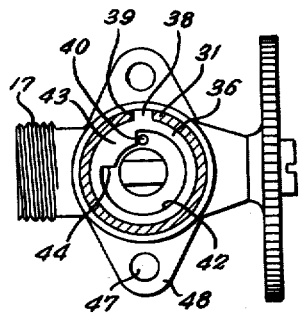
Fig. 5 is a sectional view of the shut-off valve and is taken on the line 5—5 of Fig. 4.
Figure 7:
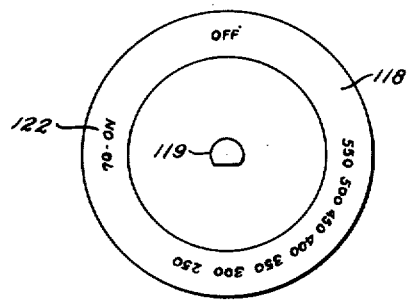
Fig. 7 is a plan view of the indicating dial as shown in Figs. 2 and 4.
Figure 6:
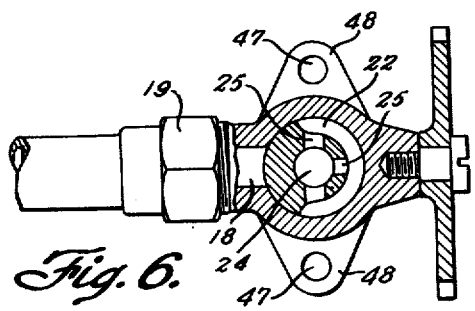
Fig. 6 is a sectional view of the shut-off valve taken on the line 6—6 of Fig. 4.

Proper assembly of the several parts of the operating structure is assured by provision of interfitting parts so arranged that the various pieces may only be assembled in the correct manner. For example, when the plug 16 of the valve 13 is in closed position (as shown in Figs. 5 and 6) the pin 40 stands against the stop 44 and the tongue end 101 of the stem stands with the flatted sides extending horizontally. The slot 110 and flatted side 114 of the shaft 106 are so related that the indicating disk when assembled will show "off" through the window 120 and the handle 10 can then be assembled with the operating handle extending vertically as shown. As the operating handle is moved from the "off" position, the first 90° of travel will cause the plug to move so that a full opening is provided for the passage of gas from the supply pipe 20 through the valve 13 and into the compartment 27' of the valve 14, at which time the "on" position is indicated to the operator by appearance within the window 20 of the words "on" as shown on the dial 122. Further movement of the operating handle 10 will cause additional movement of the valve plug and movement through the gearing to the element 60 for adjustment of this element with respect to the valve member 73. During this latter movement however, the valve 13 is maintained open and continues so until the limit of movement is reached by engagement of the pin 40 with the opposite face 44 of the projection 43. During the continued movement from the "on" position to the limit of travel the sleeve 62 of the temperature responsive element 60 further engages the stem 58 and causes an axial movement of the pin 70 to remove the valve member 73 from contact with the valve seat 75. This axial movement of the element 60 is so regulated with respect to its rate of expansion that the disk 118 may be calibrated in degrees of temperature at which the element 60 will act to regulate the flow of gas past the valve member 73 so that the space within which the element 60 projects will be heated to a degree corresponding to the calibration of the disk 118.

When the control device is first assembled within the stove it is necessary to initially adjust the element 60 so that the flow of gas past the valve member 73 will correspond to the indications of the dial 118. This adjustment is readily accomplished by manually moving the gear 99 against the tension of the spring 103 to a position out of meshing engagement with the gear 96 so that this gear and the intermeshing gear 95 of the element may be rotated independently for adjustment of the element. Further adjustment is provided by the screw 68, rotation of which moves the rod portion 65 of the element relatively to the tubular portion 61.

Leakage of gas from any part of the control device 12 is restrained by proper sealing of all possible outlets. For example, the valve plug 16 is a taper fit in the housing 15 and is held in place by tension of the spring 35, the connection between the valve 13 and valve 14 may be sealed by use of a suitable gasket between the adjoining faces of these two valves. Leakage of gas through the passage in which the pin 70 operates is restrained by provision of a series of spaced annular grooves 125 which are packed with a suitable grease before inserting the pin in place. The threaded engagement of the sleeve 62 on the stem 58 further restrains any tendency of leakage from the valve 50 through the pin passage.

The plate 112 carrying the operating handle and parts is readily attachable to the stove structure. As shown, the upper end of the plate 112, which terminates in a flange 127, is received beneath an overlying flange 129 which is formed from the stove top 130. Spaced spring 132 are positioned within the confines of the overlying flange 129 and are attached to the stove structure by means of bolts 133. The springs 132 are each formed with a looped end portion 134 so proportioned as to engage the upper end of the plate when it is inserted beneath the overlying flange of the stove top. The lower portion of the plate 112 is provided with spaced brackets 136 each of which has an attached threaded bolt 137 of sufficient length to extend through an opening in the plate 104 of the stove structure. By merely tightening nuts 140 on the screws 137 when inserted through the plate 104, the plate structure 112 is securely held in assembled position so that the operating handle and shaft are properly aligned with the stem 30 of the control device.

Referring particularly to Figs. 8 to 13, a control device is illustrated having an arrangement of parts in which the temperature responsive element is positioned for use in a space remote from the temperature controlled valve. As shown, a shut-off valve 150 is provided comprising a housing 151 having a gas inlet 152 connected to a supply source 153, and a gas outlet 155 having connecting ears 156 for attachment of a temperature controlled valve 158. A plug 160 is provided in the housing 151 and has an extended stem portion 161 for attachment of an indicating dial 162 and operating handle 163. The plug 160 is tapered and is maintained in proper operating engagement within the housing by provision of a spring 165 which is tensioned between a washer 166 on the housing and a nut 168 provided on a threaded stem portion 170 which extends from the plug in a direction opposite to that of the stem 161.

The temperature controlled valve 158 comprises a cylindrical shell having a threadedly attached end cover 172 which is removable for access to the interior of the valve. The housing 158 is provided with an axially extending boss 173 which is externally threaded to receive the internally threaded hub 175 of a spur gear 176. One end of the hub 175 is attached to the boss 173 by a left hand threaded engagement while the opposite end of the hub 175 is provided with a right hand thread for engagement with an axially extending tubular member 178. The remote end of the tubular member 178 has attached to it an elbow 179 and the opposite end of the elbow has attached to it the tubuluar member 180 of a temperature responsive element 182. The remote end of the member 180 is capped as shown at 184 and the cap is provided with an adjusting screw 185 which bears against the end of the telescoped rod member 187 of the element 182. The element 182 like the element 60 preferably comprises an exterior tube 180 of copper and a telescoped interior rod 187 of carbon. Movement in the rod 187 relative to the tube 182 is communicated to a valve operating rod 195 carried within the tubular member 178. This movement is transmitted by a series of balls 191 carried within the elbow 179; the end balls of the series contracting with the adjacent ends of the rods 187 and 195. The ball series 191 are slidably received within the bore 192 of the elbow so that an axial movement in the rod 187 directed against the end ball 190 of the series will cause movement to be transmitted throughout the series to the opposite end ball 194 where the movement is transmitted to the rod 195 at a right angle to the movement in the rod 187. The rod 195 is slidably mounted within the tubular member 178 and terminates within the housing of the valve 158 against a valve member 196. The valve member 196 is of cup-like form having an upturned flange, the edge of which is adapted to rest against an annular shoulder 197 of the valve 158; a spring 198 being provided to urge the valve member toward closed position. The tube 178, rod 195, elbow 179, and balls 191 are preferably all formed of material having the same expansion coefficient so that expansion as a result of temperature change will be balanced throughout this assembly of parts. As the tubular member 180 of the element 182 is attached to the member 178, and through the hub 175 is connected to the housing of the valve 158, and the rod 187 of the element is in contacting engagement with the rod 195 which contacts with the valve member 196, expansion in the element due to temperature change will provide for relative movement of the valve member 196 with respect to the valve seat 197 so that the flow of gas through the valve 158 will be regulated in accordance with the temperature of the space within which the element 182 stands. Initial temperature adjustment of the temperature controlled valve 158 is provided by a gear 200 which is mounted on the stem portion 178 of the valve 158 and is positioned in meshing engagement with the gear 176 so that as the valve plug is rotated the gear hub 175 will also rotate, and, due to the right and left hand threaded engagement with the valve housing and element supporting member, will provide a relative movement between these parts for adjustment of the valve member 196. The plug of the valve 158 like the plug of valve 13 is arranged so that an initial movement of 90° will move the shut-off valve from closed to fully open position, and further movement of the plug will not effect the passage of fuel through the valve 158 but will provide for adjustment of the thermostatic element with respect to the valve member 198.

While the forms of apparatus herein described constitute preferred embodiments of the invention, it is to be understood that the invention is not limited to this precise form of apparatus, and that changes may be made therein without departing from the scope of the invention which is defined in the appended claims.

What is claimed is:

1. A control device attachable to a supply source for regulating the flow of gas to a gas burner, comprising a shut-off valve, operating means therefor, a temperature controlled valve connected to said shut-off valve to receive a flow of gas therefrom, said temperature controlled valve comprising a housing, a valve member within the housing, a temperature responsive element comprising telescoping members, the exterior member thereof threadedly engaging said housing, the interior member thereof contacting with said valve member to control the passage of gas through said temperature controlled valve in accordance with the temperature of said element, and means connecting the exterior member of said element with the shut-off valve for adjusting the position of said element with respect to said temperature controlled valve upon operation of the shut-off valve.

2. A control device attachable to a supply source for regulating the flow of gas to a gas burner, comprising a shut-off valve, said shut-off valve having a valve body, a rotatable plug therefor, a temperature controlled valve connected to said shut-off valve to receive a flow of gas therefrom, a temperature responsive element associated with said temperature controlled valve to control the passage of gas therethrough in accordance with the temperature of said element, and means connecting said element with the shut-off valve for adjusting the position of said element with respect to said temperature controlled valve upon operation of the shut-off valve, said connecting means comprising intermeshing gears, one of said gears being attached to said rotatable plug, another of said gears being attached to said temperature responsive element and movable by rotation of the plug gear.

3. A control device attachable to a supply source for regulating the flow of gas to a gas burner, comprising a shut-off valve, said shut-off valve having a valve body, a rotatable plug therefor, a temperature controlled valve connected to said shut-off valve to receive a flow of gas therefrom, a temperature responsive element associated with said temperature controlled valve to control the passage of gas therethrough in accordance with the temperature of said element, means connecting said element with the shut-off valve for adjusting the position of said element with respect to said temperature controlled valve upon operation of the shut-off valve, said connecting means comprising intermeshing gears, one of said gears being mounted on said rotatable plug, and means for resiliently tensioning said gear in meshing engagement.

4. A control device attachable to a supply source for regulating the flow of gas to a gas burner, comprising a shut-off valve, said shut-off valve having a valve body, a rotatable plug therefor, a temperature controlled valve connected to said shut-off valve to receive a flow of gas therefrom, a temperature responsive element associated with said temperature controlled valve to control the passage of gas therethrough in accordance with the temperature of said element, means connecting said element with the shut-off valve for adjusting the position of said element with respect to said temperature controlled valve upon operation of the shut-off valve, said connecting means comprising intermeshing gears, one of said gears being axially mounted on said rotatable plug and movable from intermeshing engagement for adjustment of said element relatively to said shut-off valve, and means for resiliently tensioning said gear in intermeshing engagement.

5. In a control device attachable to a supply source for regulating the flow of gas to a gas burner, a stationary temperature controlled valve, a valve member positioned therein to regulate the flow of gas therethrough, a non-rotatable temperature responsive element comprising members of different expansion coefficients relatively movable axially upon temperature change to operate the valve member, means for adjustably supporting one of the members of the temperature responsive element from the temperature controlled valve, said adjustable supporting means comprising a rotatable sleeve having right-hand threaded engagement with said valve and left-hand threaded engagement with the member of the temperature responsive element.

6. In a control device attachable to a supply source for regulating the flow of gas to a gas burner, a temperature controlled valve, a valve member positioned threrein to regulate the flow of gas therethrough, a temperature responsive element comprising members of differing expansion coefficients and movable relatively upon temperature change, means for supporting one of the members of the temperature responsive element from the temperature controlled valve comprising a tubular member adjustably connected to the temperature controlled valve, an elbow fixed to the opposite end of said tubular member, a member of the temperature responsive element fixed to the opposite end of the elbow, and means for transmitting movement of the other member of the temperature responsive element to the valve member, said last mentioned means comprising a series of contacting balls slidably mounted within said elbow and positioned between the movable member of the temperature responsive element and a rod positioned within the tubular member and contacting with the valve member.

7. In a control device attachable to a supply source for regulating the flow of gas to a gas burner, a temperature controlled valve, a valve member positioned therein to regulate the flow of gas therethrough, a temperature responsive element comprising telescoped members of differing expansion coefficients and movable relatively upon temperature change, means for supporting the exterior of the members of the temperature responsive element from the temperature controlled valve comprising a tubular member adjustably connected to the temperature controlled valve, an elbow fixed to the opposite end of said tubular member and having the exterior member of the temperature responsive element fixed thereto, means for transmitting movement of the telescoped member of the temperature responsive element to the valve member, said last mentioned means comprising a series of contacting balls slidably mounted within said elbow and positioned between the end of the telescoped member of the temperature responsive element and a rod positioned within the tubular member and contacting with the valve member, and means connected to the shut-off valve for moving said adjustable supporting means from the shut-off valve control handle.

8. In a stove structure, a control device attachable to a supply source for regulating the flow of gas to a gas burner, control means for said device, said control means comprising a panel detachably connected to said stove structure and providing a closure therefor said panel being positioned beneath the cooking top and laterally of the oven, an indicating window in said panel, a control shaft supported in said panel, means on said shaft providing an operating engagement with said control device, a control handle on said shaft, an indicating dial mounted on said shaft and movable therewith, said indicating dial having reference characters provided thereon and positioned to register with the panel window for indicating the position of the control shaft, resilient means positioned between the indicating dial and shaft to tension the shaft toward the control device and the dial toward the panel.

9. In a control device attachable to a supply source for regulating the flow of gas to a gas burner, a temperature control valve, a valve member positioned therein to regulate the flow of gas therethrough, a temperature responsive device, means for adjustably supporting the temperature responsive device from the temperature controlled valve for operation of the valve member in accordance with movements of the temperature responsive device, said adjustable supporting means comprising a sleeve movable relatively to the valve and to the temperature responsive means and attached to said parts with screw threaded engagement of opposite pitch.

10. In a control device attachable to a supply source for regulating the flow of gas to a gas burner, a temperature controlled valve comprising a housing, a fuel flow control valve member in said housing, manual adjusting means associated with said valve, a temperature responsive device for automatically adjusting said valve and comprising a temperature responsive element positioned remotely to said temperature controlled valve, a spacing member, an elbow connecting the spacing member and said element, motion transmitting means comprising a member operatively engaging said valve member, a series of contacting balls carried by said elbow for communicating movements of the element through the motion transmitting member, and means for attaching the temperature responsive device to the temperature controlled valve comprising an adjustable connection between the spacing member and the valve housing for adjusting the temperature responsive element with respect to the temperature controlled valve member.

11. In combination, a range including a cooking top, an oven at one side of said cooking top, said range having a space positioned below and within the lateral extent of said cooking top and at one side of said oven, a heating means within said oven, manually operable control means for turning said heating means on and off, a heat responsive element within said oven, means responsive to the action of said heat responsive element for regulating the heating action of said heating means when said manually operable control means is turned to on position, means connected with said regulating means for effecting predetermined adjustment thereof with respect to the heat responsive element said means being operatively connected to said manual control means to be actuated and adjusted throughout a part of the range of movement of said manual control means, said manual control means being adjustable over another portion of its range of movement for turning said heating means on and off, said regulating means being located within the space at one side of the oven and below the cooking top, and said manual control means being accessible for operation from outside the front wall of the range defiing said space.

12. In a cooking range, in combination, a cooking top, an oven at one side of said cooking top, said range having a space positioned below and within the lateral extent of said cooking top and at one side of said oven, a heating means within said oven, a heat responsive element within said oven, regulating means responsive to the action of said heat responsive element for controlling the heating action of said heating means to maintain a predetermined oven heat, said regulating means being located within the space at one side of the oven and below the cooking top, a front panel concealing said regulating means and providing a front closure for said space at the front of the range and movably connected to the range to provide access to said space, a manually operable member disposed at the front of said panel and conveniently accessible at the front of the stove for changing the setting of said regulating means, and a connection between said manually operable member and said regulating means, said panel, manually operable member and connection providing for opening movements of said front panel for access to said space without disturbing the setting of the regulating means.

BERTRAND B. KAHN

CERTIFICATE OF CORRECTION.

Patent No. 2,176,075.   October 17, 1939.

BERTRAND B. KAHN.

It is hereby certified that error appears in the printed specification of the above numbered patent requiring correction as follows: Page 3, second column, line 37, for the word "spring" read springs; page 4, first column, line 13, for "tubuluar" read tubular; line 26, for "contracting" read contacting; page 5, second column, line 9, claim 8, after "therefor" insert a comma; page 6, first column, line 13, claim 11, for "defiing" read defining; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.

ing predetermined adjustment thereof with respect to the heat responsive element said means being operatively connected to said manual control means to be actuated and adjusted throughout a part of the range of movement of said manual control means, said manual control means being adjustable over another portion of its range of movement for turning said heating means on and off, said regulating means being located within the space at one side of the oven and below the cooking top, and said manual control means being accessible for operation from outside the front wall of the range defiing said space.

12. In a cooking range, in combination, a cooking top, an oven at one side of said cooking top, said range having a space positioned below and within the lateral extent of said cooking top and at one side of said oven, a heating means within said oven, a heat responsive element within said oven, regulating means responsive to the action of said heat responsive element for controlling the heating action of said heating means to maintain a predetermined oven heat, said regulating means being located within the space at one side of the oven and below the cooking top, a front panel concealing said regulating means and providing a front closure for said space at the front of the range and movably connected to the range to provide access to said space, a manually operable member disposed at the front of said panel and conveniently accessible at the front of the stove for changing the setting of said regulating means, and a connection between said manually operable member and said regulating means, said panel, manually operable member and connection providing for opening movements of said front panel for access to said space without disturbing the setting of the regulating means.

BERTRAND B. KAHN

CERTIFICATE OF CORRECTION.

Patent No. 2,176,075.                            October 17, 1939.

BERTRAND B. KAHN.

It is hereby certified that error appears in the printed specification of the above numbered patent requiring correction as follows: Page 3, second column, line 37, for the word "spring" read springs; page 4, first column, line 13, for "tubuluar" read tubular; line 26, for "contracting" read contacting; page 5, second column, line 9, claim 8, after "therefor" insert a comma; page 6, first column, line 13, claim 11, for "defiing" read defining; and that the said Letters Patent should be read with this correction therein that the same may conform to the record of the case in the Patent Office.

Signed and sealed this 14th day of November, A. D. 1939.

(Seal)                                          Henry Van Arsdale,
Acting Commissioner of Patents.